(12) United States Patent
Lebeault et al.

(10) Patent No.: US 12,480,452 B2
(45) Date of Patent: Nov. 25, 2025

(54) AIRCRAFT DUAL-FLOW TURBINE ENGINE ASSEMBLY, THE ASSEMBLY BEING EQUIPPED WITH INCIDENCE-CONTROLLED AIR DISCHARGE FINS

(71) Applicant: SAFRAN AIRCRAFT ENGINES, Paris (FR)

(72) Inventors: Eva Julie Lebeault, Moissy-Cramayel (FR); Philippe Gérard Chanez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/251,290

(22) PCT Filed: Nov. 2, 2021

(86) PCT No.: PCT/FR2021/051918
§ 371 (c)(1),
(2) Date: May 1, 2023

(87) PCT Pub. No.: WO2022/096815
PCT Pub. Date: May 12, 2022

(65) Prior Publication Data
US 2023/0407797 A1    Dec. 21, 2023

(30) Foreign Application Priority Data

Nov. 3, 2020 (FR) ........................................ 2011267

(51) Int. Cl.
*F02C 9/00* (2006.01)
*F01D 17/12* (2006.01)
(Continued)

(52) U.S. Cl.
CPC ............... *F02C 9/18* (2013.01); *F01D 17/12* (2013.01); *F02C 6/08* (2013.01); *F02K 1/66* (2013.01);
(Continued)

(58) Field of Classification Search
None
See application file for complete search history.

(56) References Cited

U.S. PATENT DOCUMENTS 3,258,206 A * 6/1966 Simonson ........... B64C 29/0066
244/12.5
3,729,934 A    5/1973 Denning et al.
(Continued)

FOREIGN PATENT DOCUMENTS

FR       3 037 617 A1   12/2016
WO   WO 2016/156739 A1  10/2016

OTHER PUBLICATIONS

International Search Report issued Feb. 3, 2022 in PCT/FR2021/051918 filed on Nov. 2, 2021 2 pages.

*Primary Examiner* — Edwin Kang
(74) *Attorney, Agent, or Firm* — Oblon, McClelland, Maier & Neustadt, L.L.P.

(57) ABSTRACT

An aircraft dual-flow turbine engine assembly includes: an internal shroud for externally delimiting a primary flow path of the turbine engine gases; an external shroud for internally delimiting a secondary flow path of the turbine engine gas; and at least one air discharge duct extending between the internal shroud and the external shroud, the air discharge duct opening into the secondary flow path through an outlet orifice equipped with discharge fins. At least some of the discharge fins are movably mounted so as to be able to be incidence-control between a propulsion position, and a reverse thrust position.

9 Claims, 4 Drawing Sheets

(51) Int. Cl.
*F02C 6/08* (2006.01)
*F02C 9/18* (2006.01)
*F02K 1/66* (2006.01)
*F02K 1/74* (2006.01)

(52) U.S. Cl.
CPC .......... *F02K 1/74* (2013.01); *F05D 2220/323* (2013.01); *F05D 2240/128* (2013.01); *F05D 2260/60* (2013.01); *F05D 2270/051* (2013.01)

(56) References Cited

U.S. PATENT DOCUMENTS

| | | | | |
|---|---|---|---|---|
| 4,798,328 | A * | 1/1989 | Thayer | F02K 1/002 60/229 |
| 4,828,173 | A * | 5/1989 | Guerty | F02K 1/002 244/110 B |
| 4,948,072 | A * | 8/1990 | Garland | F02K 1/002 244/23 B |
| 5,261,228 | A | 11/1993 | Shuba | |
| 5,351,473 | A | 10/1994 | Shuba | |
| 5,485,958 | A * | 1/1996 | Nightingale | F02K 1/006 239/265.19 |
| 5,706,649 | A * | 1/1998 | Robinson | F02K 1/008 60/229 |
| 6,318,668 | B1 * | 11/2001 | Ulanoski | F02K 1/006 239/265.19 |
| 2013/0269366 | A1 * | 10/2013 | Haugen | F02K 3/075 60/785 |
| 2017/0058683 | A1 * | 3/2017 | Niergarth | F01D 7/00 |
| 2017/0284303 | A1 * | 10/2017 | Johnson | F02K 3/075 |
| 2018/0195465 | A1 | 7/2018 | Bruhat | |

* cited by examiner

AIRCRAFT DUAL-FLOW TURBINE ENGINE ASSEMBLY, THE ASSEMBLY BEING EQUIPPED WITH INCIDENCE-CONTROLLED AIR DISCHARGE FINS

TECHNICAL FIELD

The present invention relates to the field of aircraft dual-flow turbine engines. It relates more specifically to compressor air discharge systems, comprising discharge fins intended to direct bleed air into the secondary flow path of the turbine engine. Such discharge fins are for example known from the document WO2016/156739.

PRIOR ART

On aircraft dual-flow turbine engines, such as dual-flow or dual-body turbojet engines, it is known to install low-pressure compressor air discharge systems. These systems, which use compressor air discharge valves, also known as variable bleed valves (VBV), enable the deflection of a portion of the primary flow to the secondary flow, at the low-pressure compressor outlet. The function of these discharge systems lies in the adaptation of the air flow rate at the low-pressure compressor outlet, to ensure the operation of the high- and low-pressure compressors in the respective ranges thereof, and thus avoid detrimental phenomena such as pumping. Another function consists of evacuating pits by centrifugation at the low-pressure compressor outlet.

Discharge systems usually comprise several air discharge ducts for introducing bleed air at the low-pressure compressor outlet, into the secondary flow path. At an outlet orifice of each of these conduits, discharge fins are provided, having an angle of incidence adapted to direct the bleed air flow with an axial component in the downstream direction, when it is introduced into the secondary flow path.

Thanks to this specific direction of the bleed air flow, it is readily mixed with the secondary flow, flowing into the secondary flow path from upstream to downstream in the normal propulsion configuration.

Moreover, some aircraft turbine engine designs provide for using the secondary flow path as a counter-thrust gas flow channel. They consist for example of faired fan turbine engines, wherein the rotary fan vanes are variable-pitch. Such turbine engines, with a very high bypass ratio, are for example known as ultra-high bypass ratio (UHBR) turbine engines, and the bypass ratio thereof can be greater than 15. This concept, commonly known as variable-pitch fan (VPF), is intended to reduce the compression ratio of the fans of conventional UHBR turbine engines further, thanks to an increase in the bypass ratio. This specificity gives a very substantial gain in fuel consumption, and provides an extended operability range between the take-off and cruise phases.

Nevertheless, this type of ultra-high bypass ratio design gives rise to a particularly substantial outer diameter for the turbine engine, which requires considerable efforts in the dimensioning of the nacelle, in order to reduce the mass and the drag. A consequence of reducing the size of the nacelle can lie in the inability to install a conventional thrust reversal system therein. In such a case, the variable-pitch fan is also used to reverse the direction of the flow of the secondary flow in the secondary flow path, and thus create the counter-thrust in the reverse direction, required for aircraft deceleration during landing.

In the thrust reversal configuration, the reverse flow, essentially located in a top region of the fan, bypasses the lips of the nacelle (corresponding to the air inlet in the conventional propulsion configuration), but flows along the outer surface of the nacelle before being once again introduced into the turbine engine, by the secondary nozzle.

In this thrust reversal configuration, opposite-direction flow quality in the secondary flow path is essential to ensure a maximum counter-thrust level. However, in the secondary flow path, this counter-thrust gas flow is disturbed by the countercurrent introduction of bleed discharge air flows at the low-pressure compressor outlet.

DESCRIPTION OF THE INVENTION

To address the drawback mentioned above, in relation to the embodiments of the prior art, the invention firstly relates to an aircraft dual-flow turbine engine assembly, according to the features of claim 1.

Thus, thanks to the incidence control of the discharge fins, the assembly according to the invention is capable of discharging the flow from the discharge duct in the same axial direction as the counter-thrust gas flow flowing in the secondary flow path. In other words, the invention makes it possible to adapt the direction of the discharge fins according to whether the turbine engine is in the normal propulsion or counter-thrust configuration, such that the discharge air flow can always be introduced axially co-current into the secondary flow path.

Preferably, the invention provides at least any one of the following optional features, considered separately or in combination.

Preferably, in the propulsion position, the discharge fins have first acute pitch angles, oriented in a first direction, and in the thrust reversal position, the discharge fins have second acute pitch angles, oriented in a second direction opposite the first. Preferably, in the thrust reversal position, the movable discharge fins of the same discharge duct have second acute pitch angles of the same value, or substantially the same value.

Alternatively, in the thrust reversal position, the movable discharge fins of the same discharge duct have second acute pitch angles with at least two different values, the two end fins located respectively closest to the two opposite axial ends of the outlet orifice of the discharge duct, preferably having second acute pitch angles of values greater than that of at least one other movable discharge fin located axially between the two end fins.

This differentiation in the value of the second acute pitch angles makes it possible to locally manage the direction of the bleed flow, at the critical zones located at the upstream and downstream ends of the outlet orifice of the discharge duct.

Preferably, the assembly comprises incidence control means of the movable discharge fins, the control means being at least partially arranged between the inner and outer shell of the assembly.

Preferably, each air discharge duct opens into the primary flow path through an inlet orifice equipped with a compressor air discharge valve.

The invention also relates to an aircraft dual-flow turbine engine, comprising an assembly as described above, the latter optionally being for example an intermediate casing hub of the turbine engine.

Preferably, the turbine engine comprises a fan, with rotary variable-pitch fan vanes. Preferably, the turbine engine comprises a fan drive reduction gear.

The invention finally relates to a method for controlling such an aircraft turbine engine, comprising a step of switching from a propulsion configuration to a thrust reversal configuration, this step including an operation of modifying the incidence of the movable discharge fins, consisting of moving these fins from the propulsion position thereof to the thrust reversal position thereof.

Other advantages and features of the invention will appear in the non-limiting detailed description hereinbelow.

BRIEF DESCRIPTION OF THE DRAWINGS

This description will be given with reference to the appended drawings, in which.

DETAILED DESCRIPTION OF PREFERRED EMBODIMENTS

Figure 1:
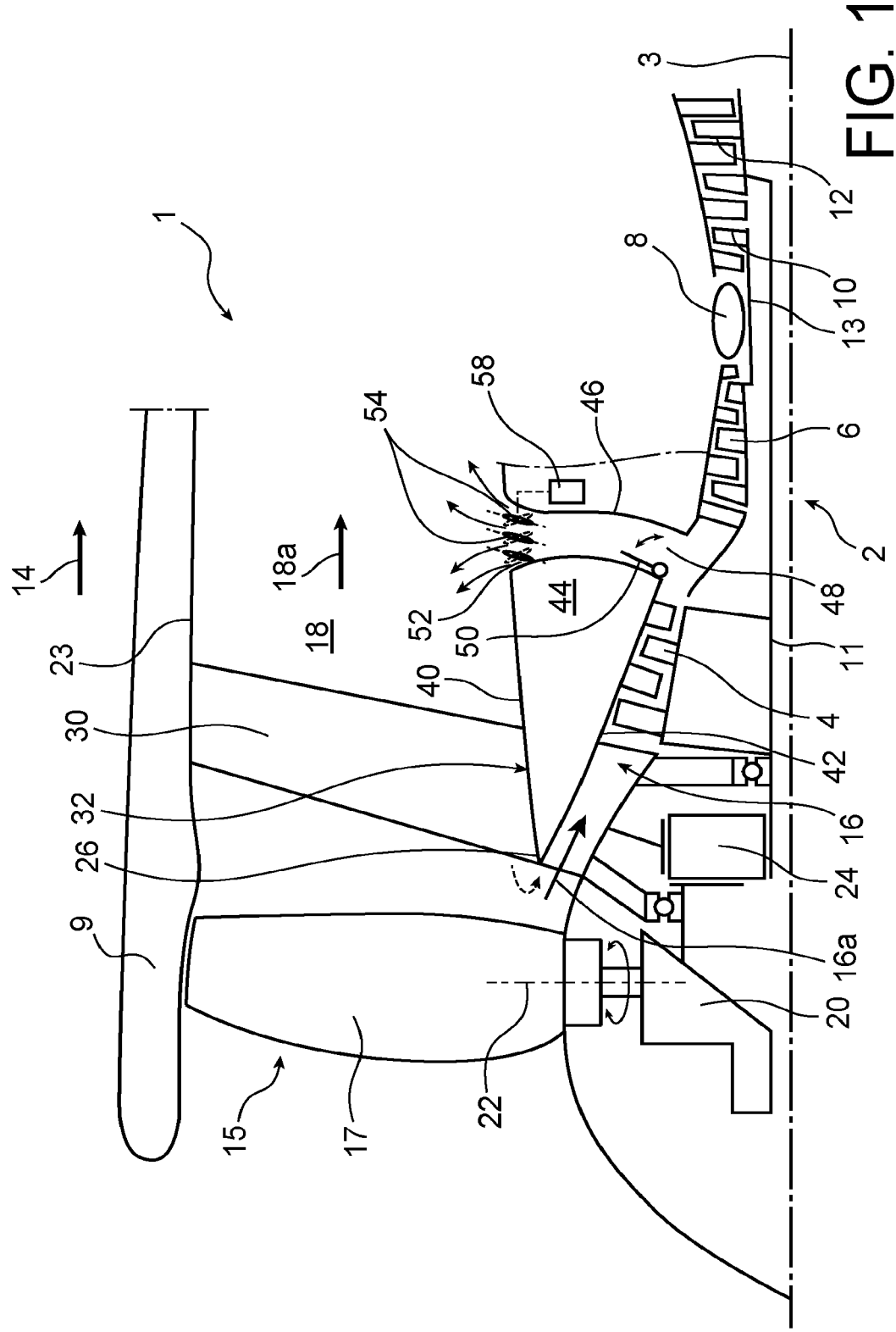
FIG. 1 shows a schematic side view of a turbojet engine according to the invention.

With reference to FIG. 1, a dual-flow and dual-body turbojet engine 1 is shown, having a high bypass ratio, preferably greater than 15. The turbojet engine 1 conventionally includes a gas generator 2 on either side of which are arranged a low-pressure compressor 4 and a low-pressure turbine 12, this gas generator 2 comprising a high-pressure compressor 6, a combustion chamber 8 and a high-pressure turbine 10. Hereinafter, the terms "upstream" and "downstream" are considered along a main direction 14 of gas flow inside the turbojet engine, when the latter is in the normal propulsion configuration.

The low-pressure compressor 4 and the low-pressure turbine 12 form a low-pressure body, and are connected to one another by a low-pressure shaft 11 centred on a longitudinal axis 3 of the turbojet engine. Similarly, the high-pressure compressor 6 and the high-pressure turbine 10 form a high-pressure body, and are connected to one another by a high-pressure shaft 13 also centred on the axis 3 and arranged about the low-pressure shaft 11.

The turbojet engine 1 further includes, upstream from the gas generator 2 and the low-pressure compressor 4, a single fan 15 which is here arranged directly behind an air inlet cone of the engine. The fan 15 includes a ring of rotary fan vanes 17 about the axis 3, this ring being surrounded by a fan casing 9. In this preferred embodiment of the invention, the fan vanes 17 are variable-pitch, i.e. the incidence thereof can be controlled by a control mechanism 20 arranged at least partially in the inlet cone, and designed to pivot these vanes 17 about the respective longitudinal axes 22 thereof. The control mechanism 20, of known mechanical, electrical, hydraulic, and/or pneumatic type design, is itself controlled by an electronic control unit (not shown), which makes it possible to order the value of the pitch angles of the vanes 17 according to the needs encountered. The VPF type fan 15, is not driven directly by the low-pressure shaft 11, but merely driven indirectly by this shaft, via a drive reduction gear 24, which makes it possible to rotate with a slower speed. Nevertheless, a direct drive solution of the fan 15, by the low-pressure shaft 11, falls within the scope of the invention.

In addition, the turbojet engine 1 defines a primary flow path 16 intended to be flowed through by a primary flow 16a, as well as a secondary flow path 18 intended to the flowed through by a secondary flow 18a located radially outwardly from the primary flow, wherein the flow from the fan is therefore divided at a flow separation nozzle 26.

As known to a person skilled in the art, the secondary flow path 18 is defined radially outwardly partially by an outer shell 23, preferably metallic, extending to the rear of the fan casing 9. In addition, downstream from the fan 15, in the secondary flow path 18, a ring of guide vanes is provided which here are outlet guide vanes (OGV) 30. These stator vanes 30 connect the outer shell 23 to an intermediate casing hub 32 surrounding the low-pressure compressor 4. These stator vanes 30 are spaced circumferentially apart from each other, and make it possible to rectify the secondary flow after it flows through the fan 15. In addition, these vanes 30 can also fulfil a structural function, by transferring the loads from the reduction gear 24 and the bearings of the motor shafts and the fan hub, to the outer shell 23. Then, these loads can transit via an engine mount (not shown) fastened to the shell 23, and connecting the turbojet engine to an attachment strut of the aircraft. In other words, the assembly 32 forms the hub of an intermediate casing, the latter being supplemented by the radial arms formed by the stator vanes 30, and also supplemented by the outer shell 23 whereon the heads of these vanes 30 are fastened. The assembly 32 also acts as an inter-flow path compartment, being created next to the roots of the stator vanes 30, but also being capable of extending in the downstream direction as represented schematically in FIG. 1. This assembly includes an outer shell 40 configured to internally define a portion of the secondary flow path 18 of gas flow, as well as an inner shell 42 configured to externally define the primary flow path 16 of gas flow. The two shells 40, 42 extend in the downstream direction from the separation nozzle 26, which connects them. Between these two shells 40, 42, an inter-flow path compartment 44 is indeed defined, wherein various components and equipment of the turbojet engine can be arranged.

Downstream from the stator guide vanes 30, the assembly 32 is equipped with a plurality of air discharge ducts 46, distributed about the axis 3. Each discharge duct 46 extends globally radially, optionally with an axial component extending in the downstream direction, from the inner shell 42 to the outer shell 40, so as to be able to connect the primary flow path 16 with the secondary flow path 18. More specifically, each air discharge duct 46 opens into the primary flow path 16 through an inlet orifice 48 equipped with a VBV discharge valve 50, the inlet orifice 48 being arranged axially between the low-pressure compressor 4 and the high-pressure compressor 6. Similarly, each air discharge duct 46 opens into the secondary flow path 18, through an outlet orifice 52 equipped with discharge fins 54.

The discharge fins 54 here have the specificity of being incidence-controlled in the outlet orifice 52, so as to adapt to the configuration of the turbojet engine. These fins 54 are thus capable of being moved from a propulsion position shown with a solid line in FIG. 1, to a thrust reversal position shown with dotted lines in the same figure, and vice versa. The aim thus lies in adapting the pitch angle of these fins 54, such that the discharge air flow from the low-pressure compressor 4 can be introduced axially co-current into the secondary flow path 18, and that the turbojet engine is in the normal propulsion configuration, or in the thrust reversal configuration.

Figure 2:
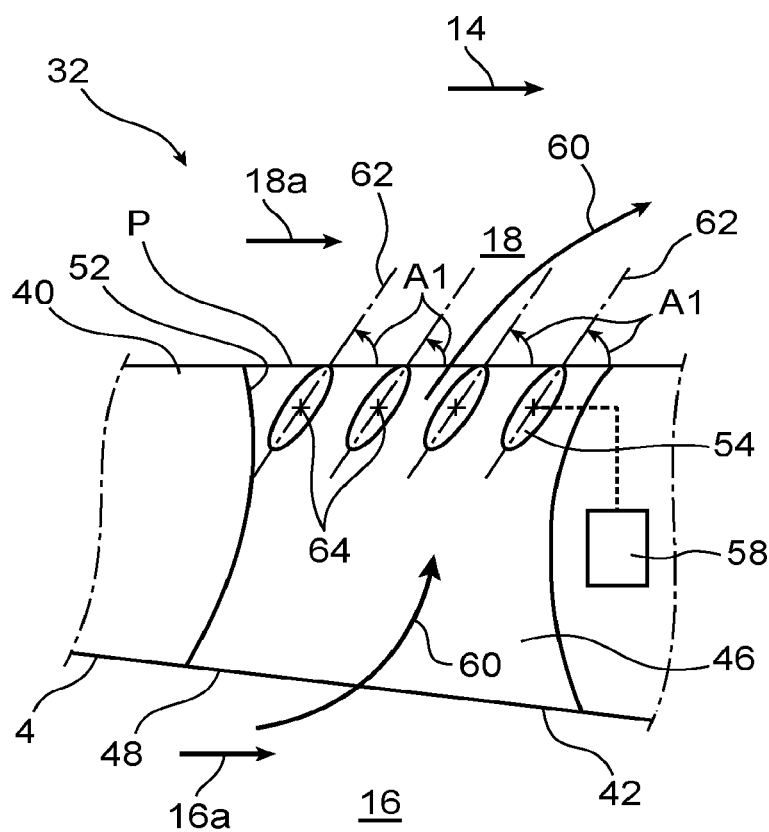
FIG. 2 represents an enlarged, more detailed view of an assembly forming an integral part of the turbine engine shown in the preceding figure, the assembly being presented according to a first preferred embodiment of the invention, with the discharge fins thereof in the propulsion position.

The incidence control of the discharge fins 54 is performed using control means 58, of known mechanical, electrical, hydraulic, and/or pneumatic type design. These control means 58 are preferably arranged, at least partially, in the inter-flow path space 44, and they are themselves controlled by an electronic control unit (not shown), which makes it possible to order the fin position required according to the turbojet engine configuration. FIG. 2 shows the discharge fins 54 in the propulsion position thereof, for introducing the discharge air flow 60 axially co-current with the secondary air flow 18a flowing in the secondary flow path 18 of the turbojet engine in the normal propulsion configuration. For this purpose, the fins 54 have first acute pitch angles A1, oriented in a first direction, corresponding to the anti-clockwise direction in FIG. 2. The pitch angle of each fin 54 is defined, conventionally, between a discharge plane P tangent or substantially tangent to the outer shell 40 at the outlet orifice 52, and a direction of the cord 62 of a profile of this fin 54.

Here, the first acute pitch angles A1 are for all the fins 54 of identical or substantially identical value, and for example between 20 and 70°. The retained inclination is therefore such that the discharge air flow 60, from the primary flow 16a, is introduced into the secondary flow path 18 from the orifice 52 along an introduction direction comprising an axial component ranging from upstream to downstream, with respect to the main flow direction 14. This direction of introduction of the discharge air flow 60 corresponds here to the cord direction 62 of the discharge fins 54, on account of the preferably symmetrical shape thereof.

The change of position of the discharge fins 54 is performed via the specific control means 58. In this regard, it is noted that these means 58 can control the incidence of each of the fins individually, or control them by group, or control them all simultaneously via linking mechanisms connecting these different fins of the same duct 46. Moreover, it is noted that in the outlet orifice 52 of each discharge duct 46, the fins 54 can be arranged inside one or more fin grids (not shown) partially sealing this orifice 52. Changing position consists of pivoting the fins 54 along the incidence pitch axes 64 thereof, which are preferably axes oriented in a tangential direction with respect to the axis 3, i.e. axes parallel with the discharge plane P, or inscribed therein.

Figure 3:
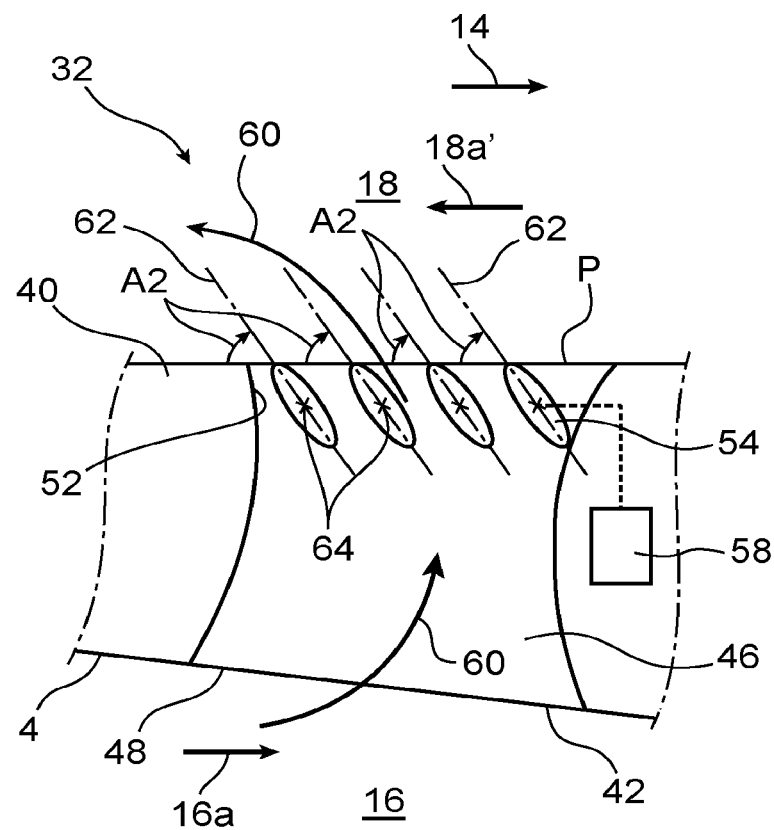
FIG. 3 is a view similar to that of FIG. 2, with the discharge fins represented in the thrust reversal configuration.

FIG. 3 represents the discharge fins 54 in the thrust reversal position thereof, after the pivoting thereof caused by the control means 58 about incidence pitch angles 64. In this thrust reversal position of the discharge fins 54, they make it possible to introduce the discharge air flow 60 axially co-current with a counter-thrust gas flow 18a' flowing in the secondary flow path 18 of the turbojet engine in the thrust reversal configuration. For this purpose, the fins 54 have second acute pitch angles A2, oriented in a second direction opposite the first, and corresponding to the clockwise direction in FIG. 3. This pitch angle of each fin 54 is also defined, conventionally, between the discharge plane P tangent or substantially tangent to the outer shell 40 at the outlet orifice 52, and the direction of the cord 62 of a profile of this fin 54.

The second acute pitch angles A2 are here, for all the fins 54 of identical or substantially identical value, and for example between 20 and 70°. The retained inclination is therefore such that the discharge air flow 60, from the primary flow 16a, is introduced into the secondary flow path 18 from the orifice 52 along an introduction direction comprising an axial component ranging from downstream to upstream, with respect to the main flow direction 14. This direction of introduction of the discharge air flow 60 corresponds here to the cord direction 62 of the discharge fins 54, on account of the preferably symmetrical shape thereof.

Figure 4:
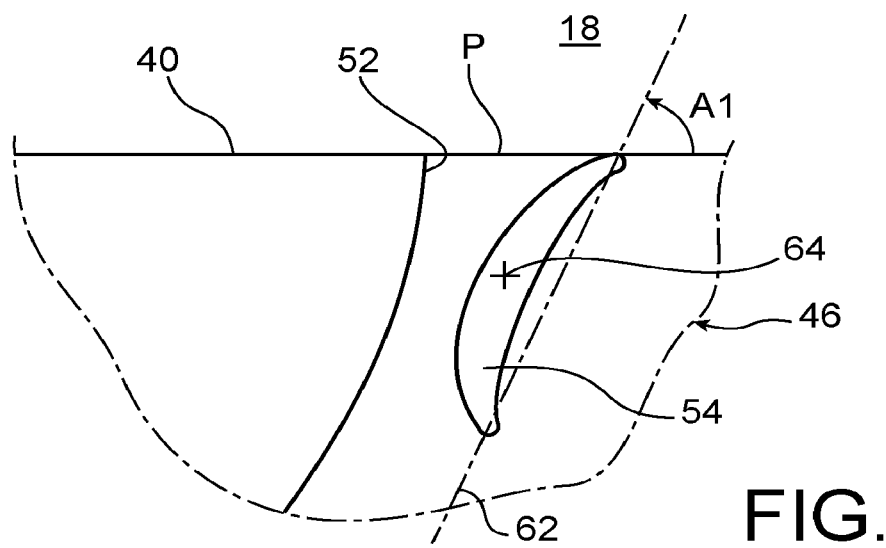
FIG. 4 is a view similar to that of FIG. 2, with the assembly being presented according to another preferred embodiment of the invention.

Further preferred embodiments of the invention can be envisaged, such as providing discharge fins 54 of non-symmetrical shape, for example adopting a vane profile as shown in FIG. 4.

Figure 5:
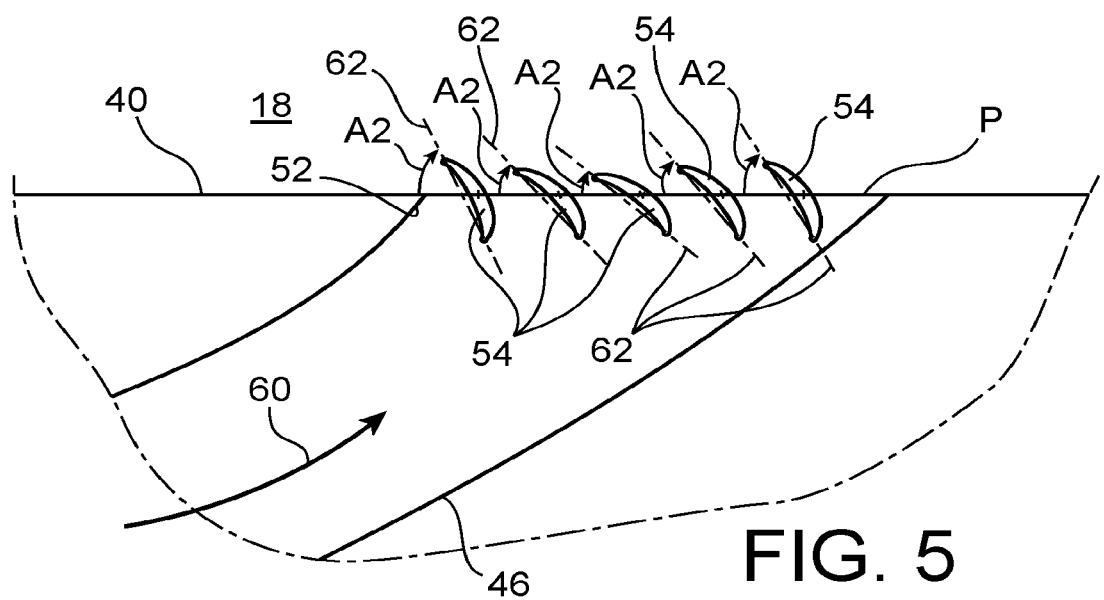
FIG. 5 is a view similar to that of FIG. 2, with the assembly being presented according to a further preferred embodiment of the invention.

A further embodiment is shown in FIG. 5, wherein in the thrust reversal position, the fins 54 of the same discharge conduit 46 no longer have second acute pitch angles A2 of the same value or substantially the same value, but having on the other hand at least two different values. In this embodiment, the two fins 54 which have the greatest value for the second acute pitch angle A2 are the two end fins, located respectively at the two opposite axial ends of the outlet orifice 52. The value of this angle A2 is therefore lower for the other fins 54 located more to the centre, with optionally a gradual reduction of this angle value towards the centre of the outlet orifice 52.

Alternatively, the greatest value for the second acute pitch angle A2 could be applied only to the upstream end fin 54, to bypass the critical zone formed by the upstream end portion of the nozzle-shaped outlet orifice 52. Indeed, in this critical zone shown in FIG. 5, an excessive axial deflection of the discharge air flow 60 could prove to be unsuitable in view of the bypassing of the nozzle, hence the benefit of locally increasing the value of the angle A2 for the discharge fin located directly axially facing this nozzle.

Of course, various modifications may be made by the person skilled in the art to the invention as described, by way of non-limiting examples only, the scope of which is defined by the appended claims. In particular, the different preferred embodiments described above can be combined with each other.

The invention claimed is:

1. An aircraft dual-flow turbine engine assembly, comprising:
  an inner shell configured to externally define a primary flow path of primary flow of an aircraft dual-flow turbine engine;
  an outer shell configured to internally define a secondary flow path of secondary flow of the aircraft dual-flow turbine engine;
  an air discharge duct extending between the inner shell and the outer shell, the air discharge duct opening into the secondary flow path through an outlet orifice equipped with discharge fins, wherein the discharge fins are movably mounted so as to be able to be incidence-controlled between a propulsion position, and a thrust reversal position,
  wherein pitch axes of the discharge fins are arranged on a straight line;
  wherein the aircraft dual-flow turbine engine assembly is designed to move the discharge fins in the propulsion position, such that a first discharge air flow, from the primary flow, is introduced into the secondary flow path from the outlet orifice along a first introduction direction comprising a first axial component from upstream to downstream, axially co-current with the secondary flow flowing in the secondary flow path of the aircraft dual-flow turbine engine in a normal propulsion configuration,
  wherein the aircraft dual-flow turbine engine assembly is also designed to move the discharge fins in the thrust reversal position, such that a second discharge air flow, from the primary flow, is introduced into the secondary flow path from the outlet orifice along a second introduction direction comprising a second axial component from downstream to upstream, axially co-current with a counter-thrust gas flow flowing in the secondary flow path of the aircraft dual-flow turbine engine in a thrust reversal configuration, wherein in the propulsion position, the discharge fins have first acute pitch angles, oriented in a first direction with respect to a longitudinal axis of the aircraft dual-flow turbine engine, and wherein in the thrust reversal position, the discharge fins have second acute pitch angles, oriented in a second direction with respect to the longitudinal axis of the aircraft dual-flow turbine engine, the second direction being opposite to the first direction, and wherein in the thrust reversal position, the discharge fins of the air discharge duct have the second acute pitch angles with at least two different values oriented in the second direction, two end fins located respectively closest to two opposite axial ends of the outlet orifice of the air discharge duct having the second acute pitch angles of values greater than that of at least one other discharge fin located axially between the two end fins.

2. The aircraft dual-flow turbine engine assembly according to claim 1, comprising incidence control means of the discharge fins, the incidence control means being at least partially arranged between the inner and outer shell of the aircraft dual-flow turbine engine assembly.

3. The aircraft dual-flow turbine engine, comprising the aircraft dual-flow turbine engine assembly according to claim 1.

4. The aircraft dual-flow turbine engine according to claim 3, comprising a fan with rotary variable-pitch fan vanes.

5. The aircraft dual-flow turbine engine according to claim 4, comprising a drive reduction gear of the fan.

6. A method for controlling the aircraft dual-flow turbine engine according to claim 3, comprising:

switching from the propulsion configuration to the thrust reversal configuration including an operation of modifying an incidence of the discharge fins, including moving the discharge fins from the propulsion position thereof to the thrust reversal position thereof, such that the second discharge air flow, from the primary flow, is introduced into the secondary flow path from the outlet orifice along the second introduction direction comprising the second axial component from downstream to upstream, axially co-current with the counter-thrust gas flow flowing in the secondary flow path of the aircraft dual-flow turbine engine in the thrust reversal configuration.

7. The aircraft dual-flow turbine engine assembly according to claim 1, wherein the discharge fins have a symmetrical shape.

8. The aircraft dual-flow turbine engine assembly according to claim 1, wherein the discharge fins have a non-symmetrical shape.

9. The aircraft dual-flow turbine engine according to claim 3, wherein the aircraft dual-flow turbine assembly is arranged axially between a low-pressure compressor and a high-pressure compressor.

* * * * *